(12) United States Patent
Pfeiffer

(10) Patent No.: US 6,254,315 B1
(45) Date of Patent: Jul. 3, 2001

(54) EDUCTOR WAND FOR BULK PARTICULATE MATERIALS

(75) Inventor: John W. Pfeiffer, Hugesville, PA (US)

(73) Assignee: The Young Industries, Inc., Muncy, PA (US)

( * ) Notice: Subject to any disclaimer, the term of this patent is extended or adjusted under 35 U.S.C. 154(b) by 0 days.

(21) Appl. No.: 09/461,868

(22) Filed: Dec. 15, 1999

(51) Int. Cl.⁷ ..................................... B65G 53/14
(52) U.S. Cl. ........................ 406/117; 406/113; 406/153
(58) Field of Search ................................. 406/113, 117, 406/153; 239/270

(56) References Cited

U.S. PATENT DOCUMENTS 3,512,841 * 5/1970 Kollasch et al. ..................... 302/51
5,899,641 * 5/1999 Pfeiffer ................................. 406/144

\* cited by examiner

Primary Examiner—H. Grant Skaggs
Assistant Examiner—Joe Dillon, Jr.
(74) Attorney, Agent, or Firm—Lalos & Keegan

(57) ABSTRACT

An eductor wand for vacuuming free flowing, bulk particulate materials consisting generally of a first conduit having first and second inlets; a venturi disposed within such first conduit and spaced therefrom to provide a passageway therebetween intercommunicating the first and second inlets of the first conduit and having an inlet disposed adjacent the first inlet of the first conduit and an outlet communicable with a particulate material conveying means; and a second conduit having an inlet connectable to a source of air under pressure and an outlet configured to inject pressurized air into the venturi inlet whereby upon applying air under pressure to the second conduit and positioning the first conduit inlet adjacent a mass of particular material, a low pressure zone will be created in the first conduit inlet causing particulate material to be drawn through the first inlet of the first conduit and ambient air to be drawn through the second inlet of the first conduit, and such particulate and ambient air to become entrained in the pressurized air injected into and through the venturi.

10 Claims, 1 Drawing Sheet

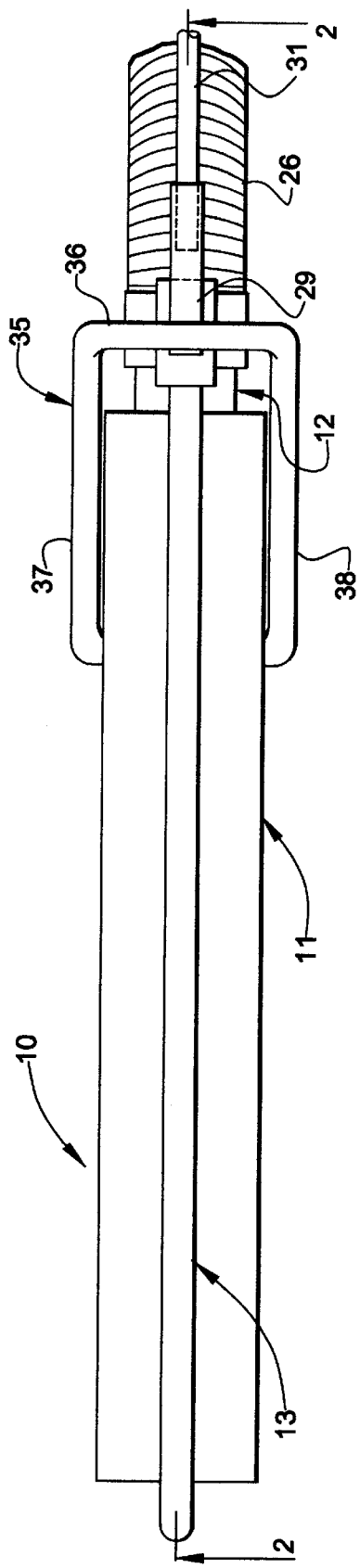
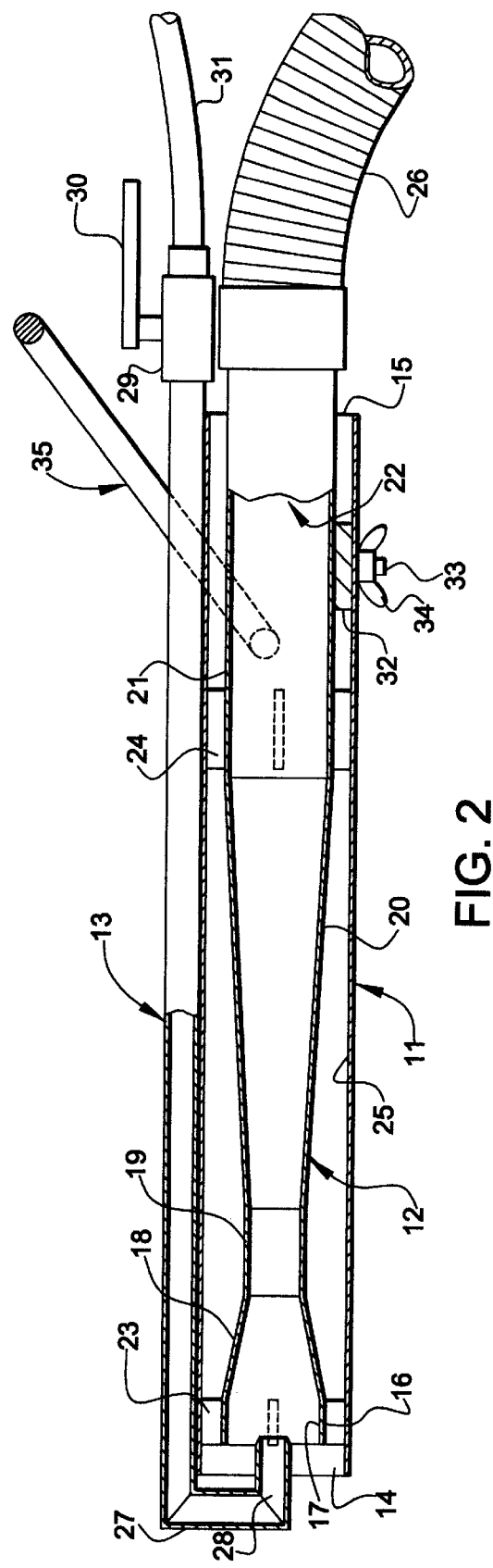

EDUCTOR WAND FOR BULK PARTICULATE MATERIALS

This invention relates to an eductor wand for unloading bulk particulate materials from various containers such as bags and drums utilizing a conventional source of compressed gas typically available in plant facilities as a motive gas.

BACKGROUND OF THE INVENTION

In the chemical processing and other industries, many bulk particulate materials often are transported in bags, drums and other portable containers which often are required to be unloaded and transferred into conveying systems, reactor vessels or storage vessels. Such unloading and transferring commonly is performed manually or with the aid of various lifting and dumping devices. In either instance, physical manual effort is required which has its limitations and often spillage of material occurs. In some plant facilities where a vacuum pump may be available and convenient, various vacuum devices may be used for unloading such materials and recovering any spillage of the materials. An example of one of such devices is illustrated and described in U.S. Pat. No. 5,769,572.

Many plant facilities are neither equipped nor have conveniently available vacuum pumps required for such prior art vacuuming devices. Such facilities, however, usually are equipped with a source of compressed air which may be utilized to provide a motive force in a device for unloading bulk particulate materials and recovering spillage occurring in the handling of such material. It thus is the principal object of the present invention to provide a manually operated device in the form of an eductor wand which is adapted to utilize a conventional, generally available source of compressed air found in plant facilities as a motive force for unloading freely flowing bulk particulate materials from various types of containers and otherwise recover such materials.

SUMMARY OF THE INVENTION

The present invention provides an eductor wand for vacuuming freely flowing bulk particulate material generally consisting of a first conduit having a particulate material inlet and a dilutive air inlet; a venturi disposed within such first conduit and spaced therefrom to provide a passageway therebetween intercommunicating the particulate material and dilutive air inlets, having an inlet disposed adjacent the particulate material inlet and an outlet communicable with a particulate material conveying means; and a second conduit mounted on the first conduit having an inlet communicable with a supply of air under pressure and an outlet configured to inject such pressurized air into the inlet of such venturi to create a low pressure zone at the particulate material inlet of such first conduit whereby upon applying air under pressure to such second conduit which is injected into such venturi, and the particulate material inlet of the first conduit is positioned in or adjacent a mass of particulate material, particulate material will be drawn through such particulate material inlet, dilutive, ambient air will be drawn through the dilutive air inlet and such particulate material and dilutive air will be entrained in the compressed air injected into the venturi to convey the particulate material through the venturi and the connected conveying means to its desired destination. Preferably, the venturi is mounted within the first conduit in a manner so as to permit its longitudinal displacement relative to the first conduit and correspondingly the displacement of the inlet thereof with the outlet of the second conduit, a valve is provided in the second conduit for controlling the flow of pressurized air through the second conduit, and a handle is provided which may be manually gripped to maneuver the wand for unloading material from containers or guiding it along surfaces to recover spilled material.

BRIEF DESCRIPTION OF THE DRAWING

FIG. 1 is a top plan view of an embodiment of the invention; and

FIG. 2 is a cross-sectional view of taken along line 2—2 in FIG. 1.

DESCRIPTION OF THE PREFERRED EMBODIMENT OF THE INVENTION

Referring to the drawing, there is illustrated an eductor wand 10 embodying the present invention, which generally includes a first conduit 11, a venturi 12 and a second conduit 13. Conduit 11 has a cylindrical configuration including a first inlet 14 and a second inlet 15 at the opposite end thereof. Venturi 12 includes a cylindrical section 16 defining an inlet 17, a converging, frusto-conical section 18, a cylindrical restricted section 19, a diverging, frusto-conical section 20 and a cylindrical section 21 defining an outlet 22.

Provided between the cylindrical sections of the venturi and the inner surface of conduit 11 are sets 23 and 24 of circumferentially spacer tabs 23 and 24 which center the venturi within conduit 11 so that the two members are disposed coaxially, providing an annular passageway 25, intercommunicating first inlet 14 and second inlet 15 of conduit 11. A flexible hose 26 is fitted onto the free end of venturi section 21 for receiving material through the venturi and conveying it to a desired location including a conveying system, a reaction vessel, a storage vessel, or some other repository. As best shown in FIG. 2, venturi section 16 is spaced inwardly relative to the end of conduit 11, and venturi section 21 extends beyond the opposite end of conduit 11 to provide an annular inlet opening 15 unobstructed by the end of hose 26 fitted onto the extended portion of section 21.

Conduit 13 extends along the length of conduit 11 and is rigidly secured thereto. Front end section 27 thereof is configured to provide a nozzle portion 28 disposed coaxially with venturi 12 for injecting pressurized air through venturi inlet 17 into and through the venturi. Conduit 13 also is provided with a flow control valve 29 having an operating handle 30, and is connected to a supply of compressed air through a flexible hose line 31. Typically, hose line 31 will be connected to a conventional compressor commonly found at a plant facility, capable of providing pressures in the range of 80 to 120 psig.

As best shown in FIG. 2, a small pad 32 is secured to the outer side of venturi section 21 and is provided with a threaded stud 33 extending through a longitudinally disposed slot in conduit 11 to allow the venturi to be displaced axially relative to conduit 11. Axial displacement of the venturi relative to conduit 11 will correspondingly displace venturi inlet 17 relative to nozzle portion 28 of conduit 13 to alter the pressure conditions in the zone of venturi inlet 17. Once the desired displacement of the venturi relative to conduit 11 has been set, the two members may be locked in such position by means of a wing nut 34 threaded on to stud 33 which may be run up against the outer side of conduit 11.

The eductor wand may be manipulated manually by means of a handle 35 which has a generally u-shaped configuration including a bight section 36 and a pair of leg sections 37 and 38 secured at their free ends to opposite sides of conduit 11. The inwardly extending portions of legs 37 and 38 are disposed substantially radially relative to the axis of cylinder 11 and the handle generally lies in a plane disposed at a convenient angle relative to the axis of conduit 11.

In the use of the eductor wand as described, with conduit 13 connected to a supply of pressurized air by means of hose line 31 and venturi 12 connected to a receptor for material to be conveyed by means of flexible hose 26, valve 26 may be opened to supply air under pressure through conduit 13 and nozzle 18, and into and through venturi 12. By means of handle 35, the device may then be manipulated to position conduit inlet 14 into or adjacent a mass of free-flowing, bulk particulate material to cause such material to be drawn into and through venturi 12. The velocity of pressurized air injected by nozzle section 28 into and through inlet 17 will create an annular low pressure zone in conduit inlet 14 thus causing particulate material in or adjacent such zone to be drawn into venturi inlet 17 and be entrained in the pressurized gas injected through the venturi. Such low pressure zone further will cause dilutive, secondary air to be drawn through second inlet 15 and through annular passageway 25 to dilute the gas/particulate material mixture and thus facilitate the flow of particulate material into venturi opening 17 and the entrainment of such material in the stream of high pressure gas injected through the venturi. The operating characteristics of the device may be adjusted merely by loosening wing nut 34, displacing the venturi relative to conduit 11 and then tightening the wing nut. Such displacement of the venturi will alter the configuration and effect of the low pressure zone formed in conduit inlet 14.

The device as described can be formed of any suitable, sturdy materials that are compatible with the particulate material with which it is intended to be used. Preferably, the device is formed of a metal such as steel or aluminum. Conduit 11 may be formed of any tubular stock material cut to the desired length. Venturi 12 may be formed in different sections and secured together by welding or brazing. Spacer tabs 23 and 24 may be formed of any suitable material and secured to the inner side of conduit 11 by an adhesive or other means. Pad 32 may be formed of any suitable material and may be secured to the outer surface of venturi 12 by an adhesive or other suitable means. The device can be assembled by first installing sets 23 and 24 of the centering tabs in conduit 11, securing conduit 13 on conduit 11 by any suitable means including welding, brazing or strapping so that nozzle portion 28 is disposed coaxially with conduit 11, attaching handle 35, securing pad 32 on the outer side of venturi section 21 and then inserting the venturi through inlet 15 so that venturi section 23 is received within set 23 of spacer tabs, venturi section 21 is received within set 24 of spacer tabs and pad 32 is aligned with the slot in conduit 11. Stud 33 then may be inserted through the slot in the conduit and secured to pad 32 and wing nut 34 may be threaded onto the stud to complete the assembly of the device.

The device is portable and may be used to unload particulate material from bags, drums and the like and recover spilled particulate material on floor areas and the like, anywhere where there is provided a supply of compressed air as there normally would be in any plant facility handling particulate material. The device also may be used to convey such material to a desired location by means of a flexible hose connected to the outlet end of the venturi leading to the desired location, be it another conveying system, a reaction vessel, a storage vessel, or some other collector.

From the foregoing detailed description, it will be evident that there are a number of changes, adaptations and modifications of the present invention which come within the province of those persons having ordinary skill in the art to which aforementioned invention pertains. However, it is intended that all such variations not departing from the spirit of the invention be considered as within the scope thereof as limited solely by the appended claims.

I claim:

1. An eductor wand for vacuuming bulk particulate material comprising:

a first conduit having first and second inlets;

a venturi disposed within said first conduit and spaced therefrom to provide a passageway therebetween intercommunicating said first and second inlets of said first conduit, and having an inlet disposed adjacent said first inlet of said first conduit and an outlet communicable with a particulate material conveying means; and a second conduit mounted on said first conduit having an inlet connectable to a source of air under pressure and an outlet configured to inject pressurized air into said venturi inlet whereby upon applying air under pressure to said second conduit and positioning said first conduit inlet adjacent a mass of said particulate material, a low pressure zone will be created in said first conduit inlet causing particulate material to be drawn through said first inlet of said first conduit and ambient air to be drawn through said second inlet of said first conduit and said particulate and ambient air to become entrained in said pressurized air injected into and through said venturi.

2. An eductor wand according to claim 1 wherein said venturi is longitudinally displaceable relative to said first conduit to correspondingly displace the inlet of said venturi relative to said inlet of said first conduit.

3. An eductor wand according to claim 1 wherein said second conduit includes a flow control valve.

4. An eductor wand according to claim 1 wherein said first conduit is provided with a handle which may be manually gripped and maneuvered to position said first inlet of said first conduit adjacent a mass of said particulate material.

5. An eductor wand according to claim 1 wherein said inlet of said second conduit is connectable to a source of air pressure in the range of 80 to 120 psig.

6. An eductor wand according to claim 1 wherein said outlet of said venturi is connectable to a flexible hose leading to a particulate material receptor.

7. An eductor wand according to claim 1 wherein said venturi is centered within said first conduit by means of spacer tabs disposed therebetween.

8. An eductor wand according to claim 1 wherein said venturi and first conduit have annular cross-sectional configurations, providing a passageway therebetween having an annular configuration.

9. An eductor wand according to claim 1 wherein said first conduit is provided with a longitudinally disposed slot, and including a pad secured to said venturi, having a threaded stud projecting through said slot and a nut threaded on said stud which may be run up against said first conduit to fix the longitudinal position of said venturi relative to said first conduit whereby the displacement of said venturi relative to said first conduit may be adjusted by backing off said nut on said stud, displacing said venturi relative to said first conduit and running up said nut on said stud.

10. An eductor wand according to claim 9 wherein said nut comprises a wing nut.

* * * * *